(12) United States Patent
Utterback

(10) Patent No.: US 7,335,890 B2
(45) Date of Patent: Feb. 26, 2008

(54) METHOD AND APPARATUS FOR DETECTING ATOMIC PARTICLES

(75) Inventor: Kari Utterback, Southington, OH (US)

(73) Assignee: General Electric Company, Schenectady, NY (US)

(*) Notice: Subject to any disclaimer, the term of this patent is extended or adjusted under 35 U.S.C. 154(b) by 42 days.

(21) Appl. No.: 11/425,789

(22) Filed: Jun. 22, 2006

(65) Prior Publication Data

US 2007/0295913 A1  Dec. 27, 2007

(51) Int. Cl.
*G01T 3/00* (2006.01)
(52) U.S. Cl. .................................. 250/370.02
(58) Field of Classification Search ............ 250/370.02
See application file for complete search history.

(56) References Cited

U.S. PATENT DOCUMENTS 2,824,971 A * 2/1958 Weeks .................. 250/390.01
5,156,979 A * 10/1992 Sato et al. .................... 438/56
5,644,128 A 7/1997 Wollnik et al.

* cited by examiner

*Primary Examiner*—Dave Porta
*Assistant Examiner*—Marcus H Taningco
(74) *Attorney, Agent, or Firm*—Armstrong Teasdale LLP

(57) ABSTRACT

An atomic particle detection assembly includes at least one atomic particle detector positioned within a first chamber having a first operating pressure. The assembly also includes at least one junction apparatus coupled to the at least one atomic particle detector. The at least one junction apparatus includes at least one wall that at least partially defines a second chamber having a second operating pressure. The second pressure is greater than the first pressure and the at least one junction apparatus facilitates maintaining a predetermined pressure difference between the first chamber and the second chamber.

20 Claims, 3 Drawing Sheets

US 7,335,890 B2

METHOD AND APPARATUS FOR DETECTING ATOMIC PARTICLES

BACKGROUND OF THE INVENTION

This invention relates generally to atomic particle detection apparatus and, more particularly, to methods and apparatus for detecting neutrons in a negative pressure environment.

Neutron bombardment and scattering experiments are performed in some facilities, including facilities that perform material detection research. Some known material detection experiments include positioning a material of interest into a chamber that typically includes a neutron source and at least one neutron detector array that is positioned at a pre-determined distance from the neutron source. The material is positioned between the neutron source and the neutron detector array. Some known neutron sources generate a pre-determined neutron flux that includes neutrons having energies less than $3.2 \times 10^{-12}$ Joules (J) (20 mega-electron-volts (MeV)), that is, low energy neutrons. Such neutrons generally interact with the material of interest and interaction may scatter the neutrons from their original transport paths in a manner consistent with the properties of the material of interest. For example, the paths may be altered based on the densities and neutron cross-sections of the material's constituents. At least some of the scattered neutrons interact with the neutron detection array that facilitates a collection of data associated with at least some of the neutrons' properties, including, but not limited to, the number of neutrons interacting with the array. Some known arrays include position sensitive detectors (PSDs) that are configured to record where atomic particle interaction occurs within the detector. Such position data facilitates the study of atomic particle interactions.

Some known PSDs detect neutrons in an environment that includes air. The air facilitates undesirable scattering and attenuation of neutrons that may mitigate the effectiveness of the detection array, which may subsequently have a deleterious effect on the effectiveness of the experiments. Alternatively, some known PSDs operate in a negative pressure environment wherein a large number of PSDs in the array directly correlate to an equally large number of vacuum seals positioned between the negative pressure environment and adjacent positive pressure environments. Decreasing a diameter of the PSDs, while increasing the number of PSDs for a given volume, facilitates increasing an efficiency and effectiveness of particle detection by the array. However, increasing the number of PSDs also increases the number of vacuum seals required, and as such also increases the fabrication and installation costs associated with the array. In addition, the increased number of PSDs may also increase a potential for seal malfunction.

BRIEF DESCRIPTION OF THE INVENTION

In one aspect, an atomic particle detection assembly is provided. The atomic particle detection assembly includes at least one atomic particle detector positioned within a first chamber having a first operating pressure. The atomic particle detection assembly also includes at least one junction apparatus coupled to the atomic particle detector. The junction apparatus includes at least one wall that at least partially defines a second chamber having a second operating pressure wherein the second pressure is greater than the first pressure. The junction apparatus facilitates maintaining a pre-determined pressure difference between the first chamber and the second chamber and is configured to operate with a substantially standard atmospheric pressure within the second chamber. The particle detector includes at least one wall that at least partially defines a third chamber having a third operating pressure wherein the third pressure is greater than the first pressure. The atomic particle detector includes at least two adjacent atomic particle detectors positioned such that a distance between the two adjacent atomic particle detectors is mitigated. The junction apparatus also includes at least one body, at least one adaptor plate coupled to the body, at least one cover plate coupled to the adaptor plate, and at least one fixture coupled to the body wherein the fixture is configured to facilitate passage of at least one electrical wire. The junction apparatus further includes at least one seal configured to facilitate maintaining the pre-determined pressure difference between the first chamber and the second chamber. The at least one seal includes at least one compression plate, at least one seal ring positioned between the compression plate and the body, at least one seal ring positioned between the cover plate and the adaptor plate, and at least one seal ring positioned between the body and at least a portion of a structure wall. The detection assembly further includes at least one support member extending from at least one junction apparatus.

In another aspect, a method of detecting atomic particles is provided. The method includes providing a structure having a first chamber and a second chamber separated by a wall. The method also includes evacuating substantially all of the fluid from the first chamber such that the first pressure is a negative pressure while maintaining the second operating pressure at a substantially standard atmospheric pressure wherein the first chamber first operating pressure is less than the second operating pressure within the second chamber. The method also includes positioning at least one detection assembly within the first chamber. The at least one assembly includes a plurality of seals between the first chamber and the second chamber to facilitate maintaining a pre-determined pressure differential between the first chamber and the second chamber by preventing fluid communication between the first chamber and the second chamber. The at least one assembly also includes at least one junction apparatus that defines a third chamber that is coupled in flow communication with the second chamber. The method further includes positioning at least one seal between each detector and the junction apparatus to facilitate preventing fluid communication between the first chamber and the third chamber. The method also includes coupling a plurality of particle detectors to the junction apparatus and positioning at least one atomic particle source within the first chamber. The method further includes exposing the detection assembly to the atomic particle source such that a plurality of atomic particles impinge upon the at least one detection assembly.

In a further aspect, an atomic particle detection array is provided. The atomic particle detection array is positioned within a first chamber having a first operating pressure and includes a plurality of atomic particle detection assemblies. The plurality of atomic particle detection assemblies are positioned such that a distance defined between adjacent atomic particle detection assemblies is mitigated. The plurality of atomic particle detection assemblies includes at least one junction apparatus coupled to each of the plurality of atomic particle detection assemblies. The junction apparatus has at least one wall that at least partially defines a second chamber having a second operating pressure wherein the second pressure is greater than the first pressure. The junction apparatus facilitates maintaining a pre-determined pressure difference between the first chamber and the second chamber. Each of the detection assemblies include at least one wall that at least partially defines a third chamber having a third operating pressure wherein the third pressure is greater than the first pressure. Each of the plurality of detection assemblies comprises at least two adjacent atomic particle detectors positioned such that a distance between the at least two adjacent atomic particle detectors is mitigated. The junction apparatus also includes at least one body, at least one adaptor plate coupled to the body, at least one cover plate coupled to the adaptor plate, and at least one fixture coupled to the body wherein the fixture is configured to facilitate passage of at least one electrical wire. The junction apparatus further includes at least one seal configured to facilitate maintaining the pre-determined pressure difference between the first chamber and the second chamber. The at least one seal includes at least one compression plate, at least one seal ring positioned between the compression plate and the body, at least one seal ring positioned between the cover plate and the adaptor plate, and at least one seal ring positioned between the body and at least a portion of a structure wall.

DETAILED DESCRIPTION OF THE INVENTION

Figure 1:
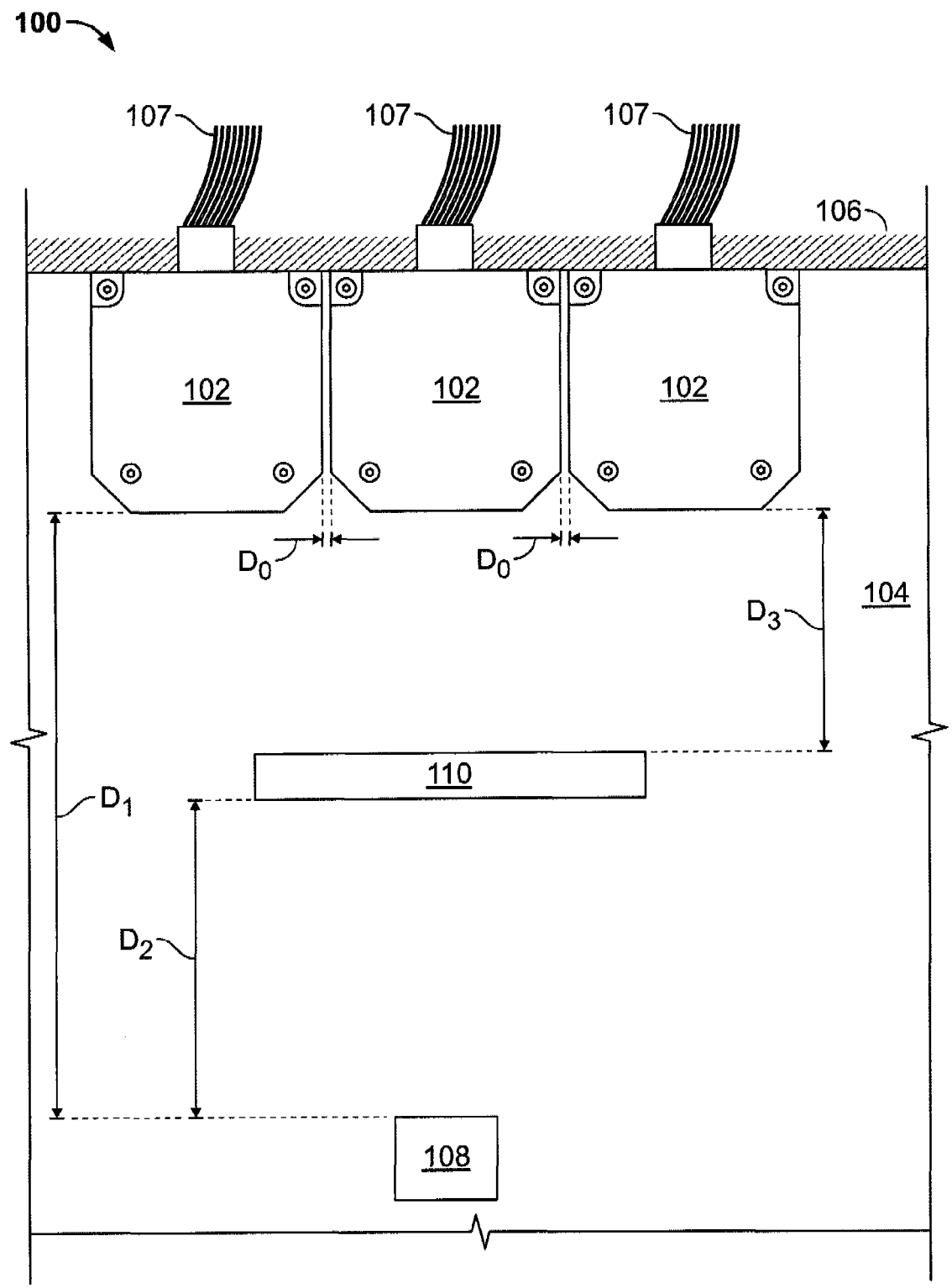
FIG. 1 is a cross-sectional schematic view of an exemplary neutron detection array.

FIG. 1 is a cross-sectional schematic view of an exemplary atomic particle detection array 100. In the exemplary embodiment, array 100 is a neutron detection array. Alternatively, array 100 may be configured to detect any atomic particles that facilitate operation of array 100 as described herein. Array 100 includes a plurality of neutron detector assemblies 102. In the exemplary embodiment, assemblies 102 form array 100 such that each of assemblies 102 are positioned adjacent to each other and a distance $D_0$ between adjacent assemblies is mitigated. This configuration facilitates mitigating a number of particles that may pass through array 100 without being detected. Also, in the exemplary embodiment, array 100 includes three assemblies 102. Alternatively, array 100 may include any number of assemblies 102 in any configuration that facilitates operation of array 100 and assemblies 102 as described herein.

Array 100 is positioned within a chamber 104 that is at least partially formed by a chamber enclosure 106. In the exemplary embodiment, chamber enclosure 106 is a ceiling and array 100 is fixedly secured to ceiling 106 using methods that include, but are not limited to, retention hardware (not shown in FIG. 1). Alternatively, chamber 104 and chamber 106 may be of any configuration and array 100 may be oriented in any manner that facilitates operation of array 100 as described herein. Each of assemblies 102 is electrically coupled with equipment that includes, but is not limited to, at least one scintillation counting apparatus and electrical power source (neither shown in FIG. 1) via a plurality of wires 107.

An atomic particle source 108 may be positioned at a pre-determined distance $D_1$ from array 100. Source 108 may also be positioned at a pre-determined longitudinal distance along a length of array 100 (neither shown in FIG. 1). In the exemplary embodiment, source 108 is a neutron source that emits neutrons (not shown in FIG. 1) with an energy of less than approximately $3.2 \times 10^{-12}$ Joules (J) (20 mega-electron-volts (MeV)), that is, low energy neutrons. Alternatively, source 108 emits atomic particles that include, but are not limited to, neutrons within any range of energy levels to facilitate operation of array 100 as described herein. Also, a material 110 of interest may be positioned a pre-determined distance $D_2$ from source 108. Material 110 is also positioned a predetermined distance $D_3$ from array 100. Distances $D_1$, $D_2$, and $D_3$ are at least partially determined by the nature of the intended experiment. In the exemplary embodiment, source 108 and material 110 are securely positioned using methods that include, but are not limited to, retention hardware and retention fixtures (neither shown in FIG. 1) such that distances $D_1$, $D_2$, and $D_3$ are substantially static. Alternatively, source 108 and material 110 may be affixed to apparatus (not shown in FIG. 1) that provides dynamic positioning of source 108 and material 110 with respect to each other and array 100.

In operation, neutron source 108 emits neutrons (not shown in FIG. 1) with an energy of less than approximately $3.2 \times 10^{-12}$ J (20 MeV), that is, low energy neutrons. At least a portion of the neutrons emitted from source 108 travel from source 108 towards array 100 and material 110. Moreover, at least a portion of these neutrons interact with material 110. A substantial portion of the neutrons that interact with material 110 are scattered. Another portion of the neutrons emitted from source 108 do not interact with material 110. Each of assemblies 102 detect at least a portion of neutrons that have interacted with material 110 and at least a portion of neutrons that have not interacted with material 110.

In the exemplary embodiment, chamber 104 is substantially evacuated of fluid, such as air and other gases and has a negative operating pressure that approaches that associated with absolute vacuum, that is, zero Pascal (Pa) (zero pounds per square inch absolute (psia)). The removal of a substantial portion of air from chamber 104 facilitates neutron transport within chamber 104 by mitigating interactions of the neutrons with air molecules. Neutrons scattered by air and not material 110 may be detected by assemblies 102 and may facilitate erroneous neutron detection. Moreover, neutrons scattered by material 110 may be further scattered by air and may escape detection by assemblies 102 or may have angles of incidence with assemblies 102 and energies not representative of their interaction with material 110, thereby possibly facilitating erroneous neutron detection.

Figure 2:
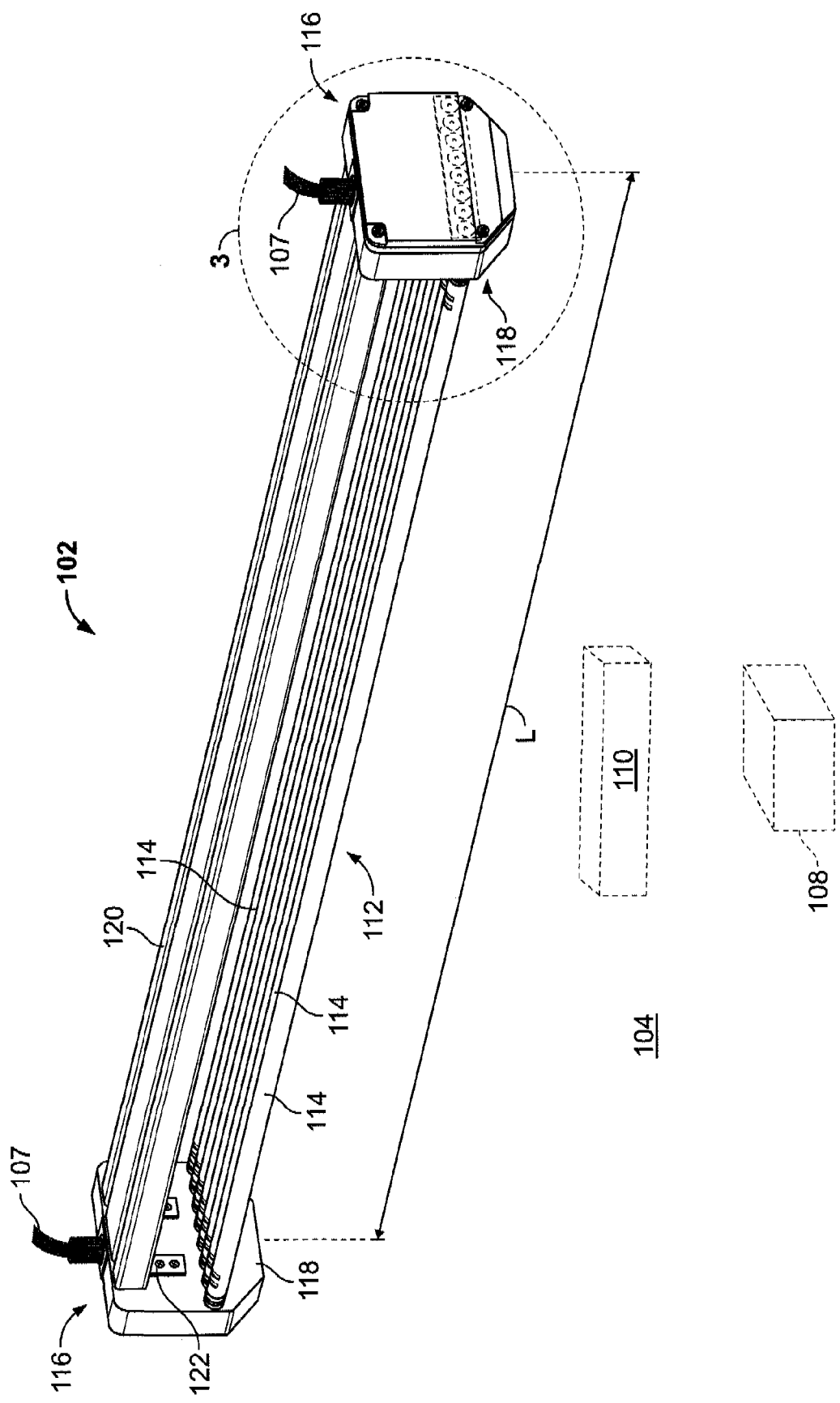
FIG. 2 is a skewed cross-sectional schematic view of an exemplary neutron detector assembly that may be used with the neutron detection array shown in FIG. 1.

FIG. 2 is a skewed cross-sectional schematic view of exemplary neutron detector assembly 102 that may be used with neutron detection array 100 (shown in FIG. 1). Source 108 and material 110 are illustrated in phantom for perspective. Assembly 102 has a longitudinal dimension L. Assembly 102 includes a neutron detector manifold 112. Manifold 112 includes a plurality of identical position sensitive detectors (PSDs) 114. In the exemplary embodiment, PSDs 114 are configured to detect low energy neutrons with energy levels less than approximately $3.2 \times 10^{-12}$ J (20 MeV). Alternatively, PSDs 114 may be configured to detect any atomic particles within any energy range that facilitates operation of PSDs 114 as described herein. Also, in the exemplary embodiment, manifold 112 includes eight substantially cylindrical PSDs 114 wherein each PSD 114 has a 1.27 centimeter (cm) (0.5-inch (in)) diameter and each of PSDs 114 is positioned within a substantially similar plane that is substantially parallel to a plane of ceiling 106 (shown in FIG. 1). Alternatively, manifold 112 may include any configuration of PSDs 114 that facilitates operation of assembly 102 as described herein including, but not limited to, four substantially cylindrical PSDs 114 wherein each PSD 114 has a 2.54 cm (1 in) diameter. Also, alternatively, PSDs 114 may be of any shape that facilitates operation of assembly 102 as described herein including, but not limited to, substantially rectangular and substantially elliptical. Further, alternatively, PSDs 114 may be configured in any plane that facilitates operation of assembly 102 as described herein.

Assembly 102 also includes a plurality of junction apparatus 116, or vacuum couplings 116. At least a portion of each coupling 116 is configured to receive a portion of manifold 112 via a wall 118 of coupling 116. In the exemplary embodiment, assembly 102 includes two substantially similar couplings 116. Specifically, assembly 102 includes one coupling 116 positioned on each longitudinal end of assembly 102.

Manifold 112 extends between both couplings 116. In the exemplary embodiment, PSDs 114 are substantially straight. Alternatively, PSDs 114 may be of any configuration that includes, but are not limited to, arcuate with a downward bow.

Assembly 102 further includes a rigid support member 120 that extends between couplings 116. Member 120 is inserted into a counter-bored region 121 and then coupled to wall 118 of each coupling 116 using methods that include, not are not limited to, retention hardware 122. Member 120 is positioned above manifold 112 to mitigate interference of particle detection within PSDs 114 by member 120. In the exemplary embodiment, member 120 is fabricated of aluminum using methods that include, but are limited to, extruding, forging and casting. Alternatively, member 120 may be fabricated of any material using any method that facilitates operation of assembly 102 as described herein. Member 120 facilitates coupling assembly 102 to chamber ceiling 106 and subsequently facilitates supporting assembly 102 within array 100. Using substantially similar fabrication methods for each member 120 for each assembly 102 within array 100 facilitates establishing a substantially similar length for each member 120. Specifically, a similar length for each of members 120 subsequently facilitates a substantially similar length for each assembly 102. Further, specifically, a substantially similar length for each assembly 102 within array 100 facilitates fitting up a plurality of assemblies 102 within array 100 such that a substantially uniform neutron detection field is formed by array 100. Such substantially uniform neutron detection field formed by array 100 facilitates more effective and efficient particle detection within array 100. Moreover, member 120 provides structural support of assembly 102 thereby facilitating shipping assembly 102 with a mitigated potential for damage. Area 3 is discussed in more detail below.

Figure 3:
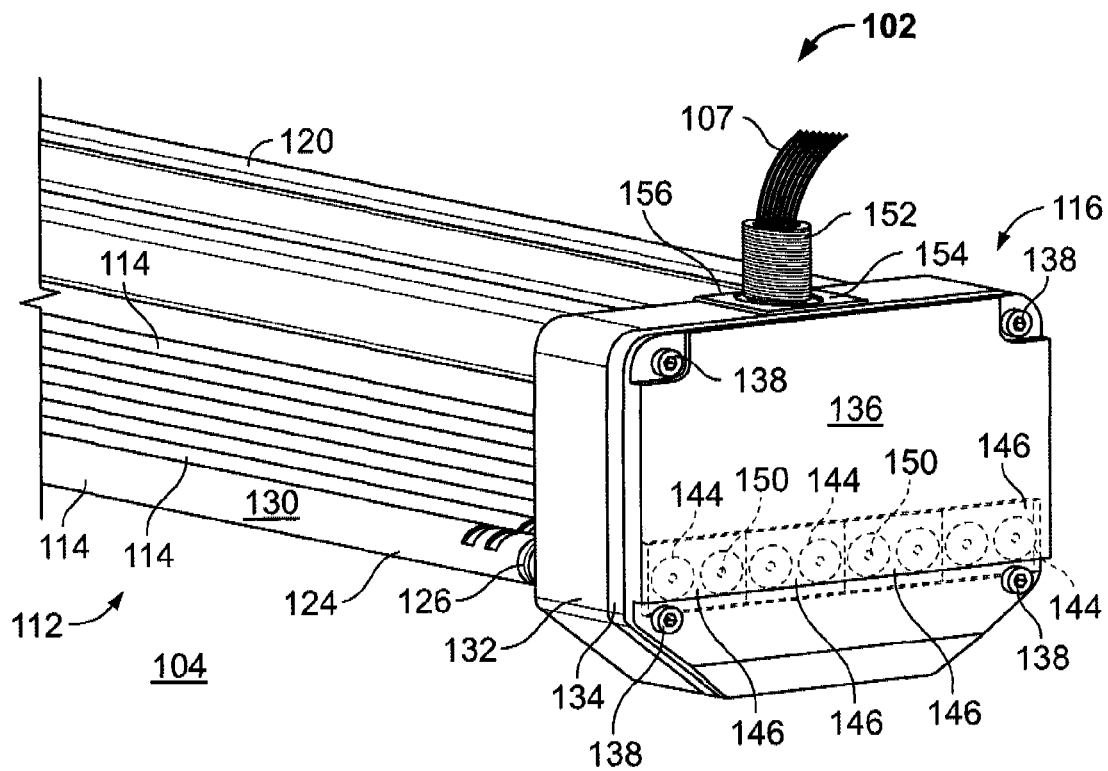
FIG. 3 is an enlarged skewed cross-sectional schematic view of the neutron detector assembly shown in FIG. 2 taken along area 3.
Figure 4:
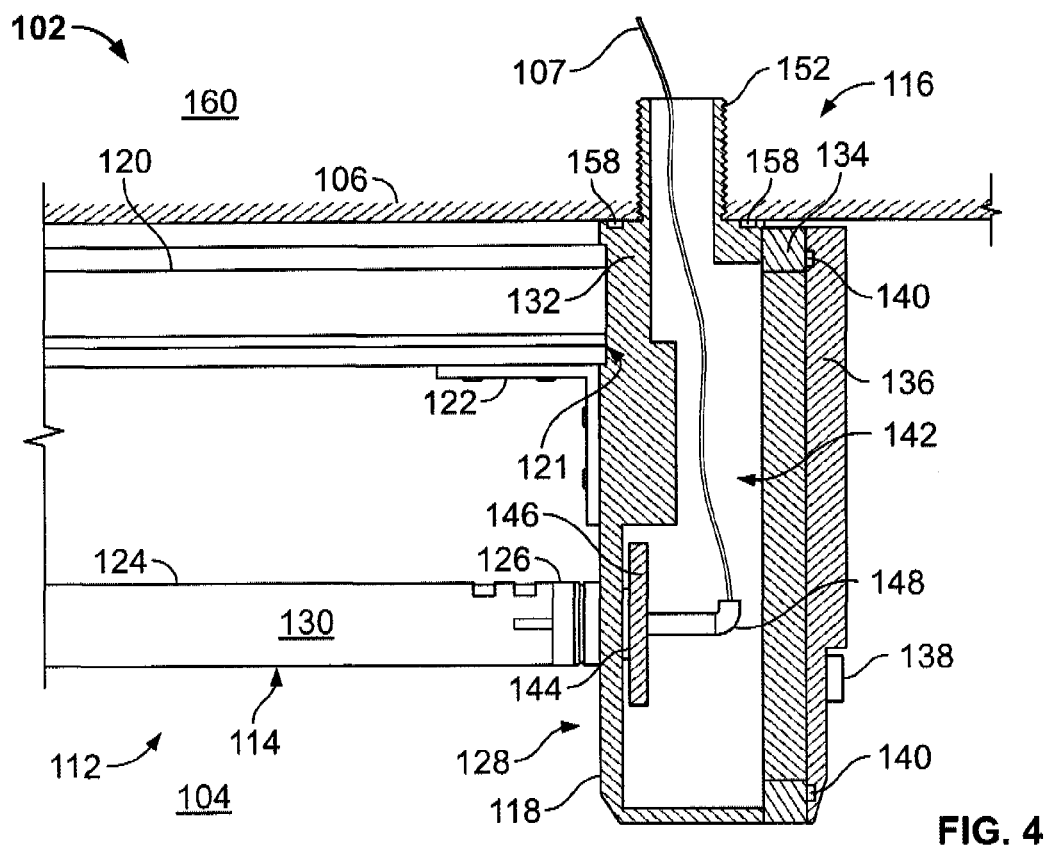
FIG. 4 is an enlarged cross-sectional schematic side view of the neutron detector assembly shown in FIG. 2.

FIG. 3 is an enlarged skewed cross-sectional schematic view of neutron detector assembly 102 (shown in FIG. 2 and taken along area 3) and FIG. 4 is an enlarged cross-sectional schematic side view of neutron detector assembly 102. Manifold 112 includes eight identical PSDs 114 (only one of eight illustrated in FIG. 4). In the exemplary embodiment, PSD 114 includes a substantially cylindrical wall 124 that is fabricated from stainless steel via methods that include, but are not limited to, extruding, rolling, casting and forging. Alternatively, wall 124 may be fabricated of any material by any method that facilitates operation of assembly 102 as described herein. PSD 114 also includes two identical headers 126 (only one shown) on each longitudinal end of PSD 114 at an interface seal 128 with coupling 116. In the exemplary embodiment, headers 126 are fabricated from materials that include, but are not limited to, stainless steel and aluminum via methods that include, but are not limited to, casting and forging. Alternatively, headers 126 are fabricated from any materials via any methods that facilitate operation of assembly 102 as described herein. Also, in the exemplary embodiment, PSD 114 is substantially sealed via methods that include, but are not limited to, welding such that wall 124 and headers 126 at least partially define a substantially annular chamber 130. In the exemplary embodiment, chamber 130 is substantially evacuated of air and is filled with gaseous materials that facilitate neutron detection via scintillation methods, the gaseous materials including, but not being limited to, an isotope of helium (He), that is, $He_3$. In the exemplary embodiment, PSDs 114 are positioned within assembly 102 such that walls 124 of adjacent PSDs 114 are approximately separated by approximately 0.077 millimeters (mm) (0.020 in) to 0.118 mm (0.030 in). This separation facilitates mitigating a number of neutrons that may pass though assembly 102 via passages between PSDs 114 and not interact with any PSDs 114. Alternatively, PSDs 114 are positioned and configured such that walls 124 of adjacent PSDs 114 are in contact with each other.

Coupling 116 includes a body 132, an adapter plate 134, and a cover plate 136. Body 132 includes wall 118 and region 121 and is configured to receive support member 120 as described above. Body 132 and plates 134 and 136 are fabricated from materials that include, but are not limited to, stainless steel and aluminum. Alternatively, body 132 and plates 134 and 136 are fabricated from any materials via any methods that facilitate operation of assembly 102 as described herein. In the exemplary embodiment, adaptor plate 134 is fixedly coupled to body 132 by methods that include, but are not limited to, seal welding and brazing. Alternatively, body 132 and plate 134 are formed as an integral unit (not shown). Further, alternatively, any method of fixedly coupling plate 134 to body 132 that facilitates operation of assembly 102 as described herein may be used.

Also, in the exemplary embodiment, cover plate 136 is removably coupled to adapter plate 134 via methods that include, but are not limited to, retention hardware 138. This removably coupled feature facilitates in-situ PSD 114 replacement in the event of individual PSD 114 malfunctions. At least one cover plate seal 140 is inserted into a groove (not shown) defined within a portion of plate 136. Seal 140 is substantially concentric along substantially the entire periphery of plate 136 and therefore facilitates sealing coupling 116. Body 132 and plates 134 and 136 at least partially define a coupling chamber 142. Seal 140 is typically inserted in the associated groove and plate 136 is coupled to plate 134 when the assembly steps performed within chamber 142 as described below are substantially completed.

Coupling 116 also includes at least one seal 128. Seal 128 includes a plurality of sealing rings 144 and a plurality of compression plates 146. Also, in the exemplary embodiment, eight passages (not shown) are defined within wall 118 that are each configured to receive one header 126. Each of eight headers 126 includes a collar (not shown) that is configured to receive a plurality of seal rings 144. Each of headers 126 are also configured to receive at least one wire 107 and at least one wire conduit 148 via a ceramic insulator (not shown) positioned within header 126 and configured to insulate header 126 from electrical power transmitted via wires 107. Wire conduit 148 facilitates routing of wire 107 within chamber 142 and wire 107 is soldered to a portion of associated PSD 114. Each of eight wire conduits 148 are routed through each of eight passages 150 defined within plates 146. Plates 146 are coupled to wall 118 via methods that include, but are not limited to, retention hardware (not shown). Coupling plates 146 to wall 118 facilitates compressing sealing rings 144. The collar associated with header 126, rings 144 and plates 146 cooperate to facilitate adjustments during assembly activities of assemblies 102 such that mitigating differences in longitudinal dimension L (shown in FIG. 2) between assemblies 102 within array 100 is facilitated.

In the exemplary embodiment, four plates 146 are used within seal 128. Alternatively, any number of plates 146 including, but not limited to, one plate 146, that facilitates insertion of plates 146 within chamber 142 may be used. For example, insertion of one plate 146 over all eight of rings 144 may be best facilitated with plate 134 removed to allow for sufficient room for assembly. Insertion of four plates 146, as described in the exemplary embodiment, facilitates assembly with plate 134 coupled to base 132.

In the exemplary embodiment, coupling 116 further includes a wire fixture 152 that is integrally fabricated with body 132. Alternatively, fixture 152 may be fabricated independently of body 132 and coupled to body 132 via methods that include, but are not limited to, welding and brazing.

Finished assembly 102 is positioned such that each of fixtures 152 are inserted into and extend through a plurality of passages (not shown) that are defined in ceiling 106. Mitigating differences in longitudinal dimension L (shown in FIG. 2) between assemblies 102 as described above facilitates uniform insertion of both fixtures 152 for each assembly 102 into ceiling 106. Assembly 102 is coupled to ceiling 106 via methods that include, but are not limited to, retention hardware (not shown) coupled to fixture 152 that is threaded and configured to receive such retention hardware. A fixture plate 154 includes a groove 156 defined within plate 154 that is configured to receive a fixture seal ring 158. Coupling assembly 102 to ceiling 106 via threading retention hardware onto fixture 152 facilitates compressing seal ring 158. In the exemplary embodiment, plate 154 is integrally fabricated with body 132. Alternatively, plate 154 may be fabricated independently of body 132 and coupled to body 132 via methods that include, but are not limited to, welding and brazing. The exemplary configuration of assembly 102 as described herein facilitates mitigating installation costs by mitigating the number of seals needed to facilitate operation of assembly 102 as described herein. Specifically, instead of configuring eight seals 156, that is, one for each wire 107, only one seal 156 is used.

Assembly 102 is configured to facilitate in-situ replacement of individual PSDs 114 in the event of at least one PSD 114 malfunction. In the event of a PSD 114 replacement, plate 136 on both ends of assembly 102 are removed to facilitate access to chamber 142. Associated conduits 148, plates 146, and seals 144 are removed and the affected PSD 114 and associated wire 107 are removed from assembly 102. A replacement PSD 114 and wires 107 are inserted in the associated passages within couplings 116, replacement seals are inserted over headers 126, conduits 148 are restored, plates 146 are coupled to wall 118, and plates 136 are re-coupled to assembly 102 on both ends.

Alternative embodiments of particle detection assemblies configuration may use individual vacuum couplings similar to coupling 116 as described herein with the exception that the alternative couplings may be much smaller than coupling 116. Some of these alternative embodiments that include PSDs with smaller diameters than the 1.27 cm (0.5 in) diameter of PSDs 114 may have diameters small enough such that reducing the dimensions of an associated single alternative vacuum coupling may not be practical and/or feasible. Therefore, the assembly configuration as described herein facilitates decreasing the alternative PSD diameters while maintaining the dimensions of coupling 116 as described herein.

During operation, chamber 104 is substantially evacuated of air and other gases and has a negative operating pressure that approaches that associated with absolute vacuum, that is, zero Pa (zero psia). Chamber 142 has an operating pressure substantially similar to the operating pressure in an equipment room 160 above ceiling 106 that is typically at a local atmospheric pressure that is substantially similar to 101 kiloPascal (kPa) (14.7 psia). Moreover, chamber 130 is pressurized to an operating pressure that facilitates predetermined testing operation of array 100. This operating pressure is typically greater than the substantial vacuum in chamber 104 and the substantially atmospheric pressure within chamber 142. Header 126 and seal 128 cooperate to mitigate fluid communication between chamber 142 and chamber 104. Moreover, seals 140 and 156 facilitate mitigating fluid communication between chamber 142 and chamber 104. Removal of air from chamber 104 and mitigating a potential for undesirable air leakage into chamber 104 during experiments facilitates desirable scattering and attenuation of neutrons. This further facilitates an effectiveness of the detection array that subsequently facilitates the effectiveness of the experiments.

Also, during operation, each of PSDs 114 are powered via wires 107 and induce a voltage potential within the $He_3$ gas contained within chamber 130. As low energy neutrons enter chamber 130 through wall 124, the neutrons interact with the $He_3$ gas which induces a plurality of scintillations within chamber 130. The plurality of scintillations induce electrical signals within PSDs 114. These electrical signals are transmitted to equipment that includes, but is not limited to, at least one scintillation apparatus (not shown) via wires 107. Such apparatus is typically positioned within equipment room 160 and is configured to receive the electrical signals and determine characteristics of the scintillations, including the PSD 114 that received the neutron as well as a position along the longitudinal dimension L of assembly 102 wherein the associated neutron entered associated PSD 114.

The methods and apparatus for detecting atomic particles described herein facilitate operation of a neutron detector. More specifically, the detector as described above facilitates a more robust neutron detection array configuration. Such array configuration also facilitates neutron detection effectiveness, efficiency, reliability, and reduced costs.

Exemplary embodiments of neutron detectors are described above in detail. The methods, apparatus and systems are not limited to the specific embodiments described herein nor to the specific illustrated neutron detectors.

While the invention has been described in terms of various specific embodiments, those skilled in the art will recognize that the invention can be practiced with modification within the spirit and scope of the claims.

What is claimed is:

1. An atomic particle detection assembly comprising:
   at least one atomic particle detector positioned within a first chamber having a first operating pressure; and at least one junction apparatus coupled to said at least one atomic particle detector, said at least one junction apparatus comprising at least one wall that at least partially defines a second chamber having a second operating pressure, wherein the second pressure is greater than the first pressure, wherein said at least one junction apparatus facilitates maintaining a pre-determined pressure difference between said first chamber and said second chamber.

2. An atomic particle detection assembly in accordance with claim 1 wherein said at least one junction apparatus is configured to operate with a substantially standard atmospheric pressure within said second chamber.

3. An atomic particle detection assembly in accordance with claim 1 wherein said at least one particle detector comprises at least one wall that at least partially defines a third chamber having a third operating pressure, the third pressure is greater than the first pressure.

4. An atomic particle detection assembly in accordance with claim 1 wherein said at least one atomic particle detector comprises at least two adjacent atomic particle detectors positioned such that a distance between the at least two adjacent atomic particle detectors is mitigated.

5. An atomic particle detection assembly in accordance with claim 1 wherein said at least one junction apparatus further comprises:
   at least one body;
   at least one adaptor plate coupled to said at least one body;
   at least one cover plate coupled to said at least one adaptor plate; and
   at least one fixture coupled to said at least one body configured to facilitate passage of at least one electrical wire.

6. An atomic particle detection assembly in accordance with claim 5 wherein said at least one junction apparatus further comprises at least one seal configured to facilitate maintaining said pre-determined pressure difference between said first chamber and said second chamber.

7. An atomic particle detection assembly in accordance with claim 6 wherein said at least one seal comprises:
   at least one compression plate;
   at least one seal ring positioned between said compression plate and said body;
   at least one seal ring positioned between said cover plate and said adaptor plate; and
   at least one seal ring positioned between said body and at least a portion of a structure wall.

8. An atomic particle detection assembly in accordance with claim 1 further comprising at least one support member extending from said at least one junction apparatus.

9. A method of detecting atomic particles, said method comprising:
   providing a structure having a first chamber and a second chamber separated by a wall, wherein the first chamber has a first operating pressure that is less than a second operating pressure within the second chamber;
   positioning at least one detection assembly within the first chamber, wherein the at least one assembly includes at least one junction apparatus that defines at least a third chamber that is coupled in flow communication with the second chamber;
   coupling a plurality of particle detectors to the junction apparatus;
   positioning at least one atomic particle source within the first chamber; and
   exposing the detection assembly to the atomic particle source such that a plurality of atomic particles impinge upon the at least one detection assembly.

10. A method in accordance with claim 9 further comprising evacuating substantially all of the fluid from the first chamber such that the first pressure is a negative pressure.

11. A method in accordance with claim 9 wherein providing a structure further comprises maintaining the second operating pressure at a substantially standard atmospheric pressure.

12. A method in accordance with claim 9 wherein positioning at least one detection assembly within the first chamber comprises positioning a plurality of seals between the first chamber and the second chamber to facilitate maintaining a pre-determined pressure differential between the first chamber and the second chamber.

13. A method in accordance with claim 12 wherein positioning a plurality of seals between the first chamber and the second chamber comprises positioning at least one seal between each detector and the junction apparatus to facilitate preventing fluid communication between the first chamber and the third chamber.

14. A method in accordance with claim 12 wherein positioning a plurality of seals between the first chamber and the second chamber comprises positioning at least one seal between the junction apparatus and the second chamber to facilitate preventing fluid communication between the first chamber and the second chamber.

15. An atomic particle detection array positioned within a first chamber having a first operating pressure comprising a plurality of atomic particle detection assemblies, said plurality of atomic particle detection assemblies positioned such that a distance defined between adjacent atomic particle detection assemblies is mitigated, each of said plurality of atomic particle detection assemblies comprising at least one junction apparatus coupled to each of said plurality of atomic particle detection assemblies, said at least one junction apparatus comprising at least one wall that at least partially defines a second chamber having a second operating pressure, wherein the second operating pressure is greater than the first pressure, wherein said at least one junction apparatus facilitates maintaining a pre-determined pressure difference between said first chamber and said second chamber.

16. An atomic particle detection array in accordance with claim 15 wherein each of said plurality of detection assemblies comprises at least one wall that at least partially defines a third chamber having a third operating pressure, the third pressure is greater than the first pressure.

17. An atomic particle detection array in accordance with claim 15 wherein each of said plurality of detection assemblies comprises at least two adjacent atomic particle detectors positioned such that a distance between the at least two adjacent atomic particle detectors is mitigated.

18. An atomic particle detection array in accordance with claim 15 wherein said at least one junction apparatus further comprises:
   at least one body;
   at least one adaptor plate coupled to said at least one body;
   at least one cover plate coupled to said at least one adaptor plate; and
   at least one fixture coupled to said at least one body configured to facilitate passage of at least one electrical wire.

19. An atomic particle detection array in accordance with claim 18 wherein said at least one junction apparatus further comprises at least one seal configured to facilitate maintaining said predetermined pressure difference between said first chamber and said second chamber.

20. An atomic particle detection array in accordance with claim 19 wherein said at least one seal comprises:
 at least one compression plate;
 at least one seal ring positioned between said compression plate and said body;
 at least one seal ring positioned between said cover plate and said adaptor plate; and
 at least one seal ring positioned between said body and at least a portion of a structure wall.

* * * * *